United States Patent [19]

Scott

[11] Patent Number: 4,932,602

[45] Date of Patent: Jun. 12, 1990

[54] DOWNRIGGER APPARATUS FOR TROLLING

[75] Inventor: Blayney J. Scott, Victoria, Canada

[73] Assignee: Scott Plastics Ltd., Victoria, Canada

[21] Appl. No.: 219,304

[22] Filed: Jul. 15, 1988

[51] Int. Cl.⁵ .................... A01K 89/017; A01K 89/02
[52] U.S. Cl. ........................................ 242/99; 242/106;
    242/250; 242/264; 242/270; 242/285; 254/366
[58] Field of Search ................. 242/99, 250, 264, 269,
    242/270, 306, 307, 308, 291, 106, 285; 254/359,
    362, 366, 368, 323

[56] References Cited

U.S. PATENT DOCUMENTS

| 458,802 | 0/1891 | Ditchy | 254/323 X |
|---|---|---|---|
| 923,559 | 6/1909 | Moser | 242/99 |
| 2,470,507 | 5/1949 | Luton et al. | 242/250 |
| 2,498,611 | 2/1950 | Stauer | 254/359 |
| 2,760,736 | 8/1956 | Mihalko et al. | 242/270 X |
| 3,220,667 | 11/1965 | Madsen | 242/250 |
| 4,037,326 | 7/1977 | Booth et al. | 242/84.1 A |
| 4,044,968 | 8/1977 | Scott | 242/84.5 R |
| 4,193,561 | 3/1980 | Stiner | 242/306 |
| 4,349,977 | 9/1982 | Brodribb et al. | 242/250 X |

OTHER PUBLICATIONS

Speedtrol Manufactured by Incoe Corporation, copy from brochure.
Electric Fathom Master 800 manufactured by Penn Reels, copy from brochure.
Big Jon Electric Downriggers manufactured by Mac--Jac Manufacturing Incorporated, copy of brochure.
Runt Elec-Trol Downrigger manufactured by Mac--Jac Manufacturing Company, Inc., copy of brochure
Mini-Mag, Magnum 10A, Digi-Troll, Marlin Electric and Digi-Troll Marlin, manufactured by Cannon/S&K Products, Inc., copy of brochure.
Model edrc Chrom Electric Downrigger, Combo-Pak Chrome Electric, Model EDR Grey Electric Downrigger, Combo-Pak Grey Electric Downrigger manufactured by Walker Downriggers and Accessories, copy of brochure.

Primary Examiner—John Petrakes
Attorney, Agent, or Firm—Bull, Housser & Tupper

[57] ABSTRACT

The apparatus spools a line carrying a weight for positioning a fishing lure at a desired depth in water for trolling. The apparatus has a motor which rotates a spool carrying the line supporting the weight. A brake automatically brakes the spool when the spool starts to unwind the line, which can occur when the motor is inoperative. Braking force on the spool can be finely adjusted to permit slipping and controlled unwinding, so that the line does not break should the weight become fouled or hung up on the bottom. Preferably, when winding up the weight, a clutch transmits torque between the motor and spool when the torque is below a slipping threshold torque. However, the clutch slips when the slipping threshold torque is exceeded and simultaneously generates an audible warning sound when slipping to protect the motor from overload if the weight becomes "hung up" when winding in. An alternative electrical circuit breaker can be substituted for the clutch to protect the motor.

21 Claims, 5 Drawing Sheets

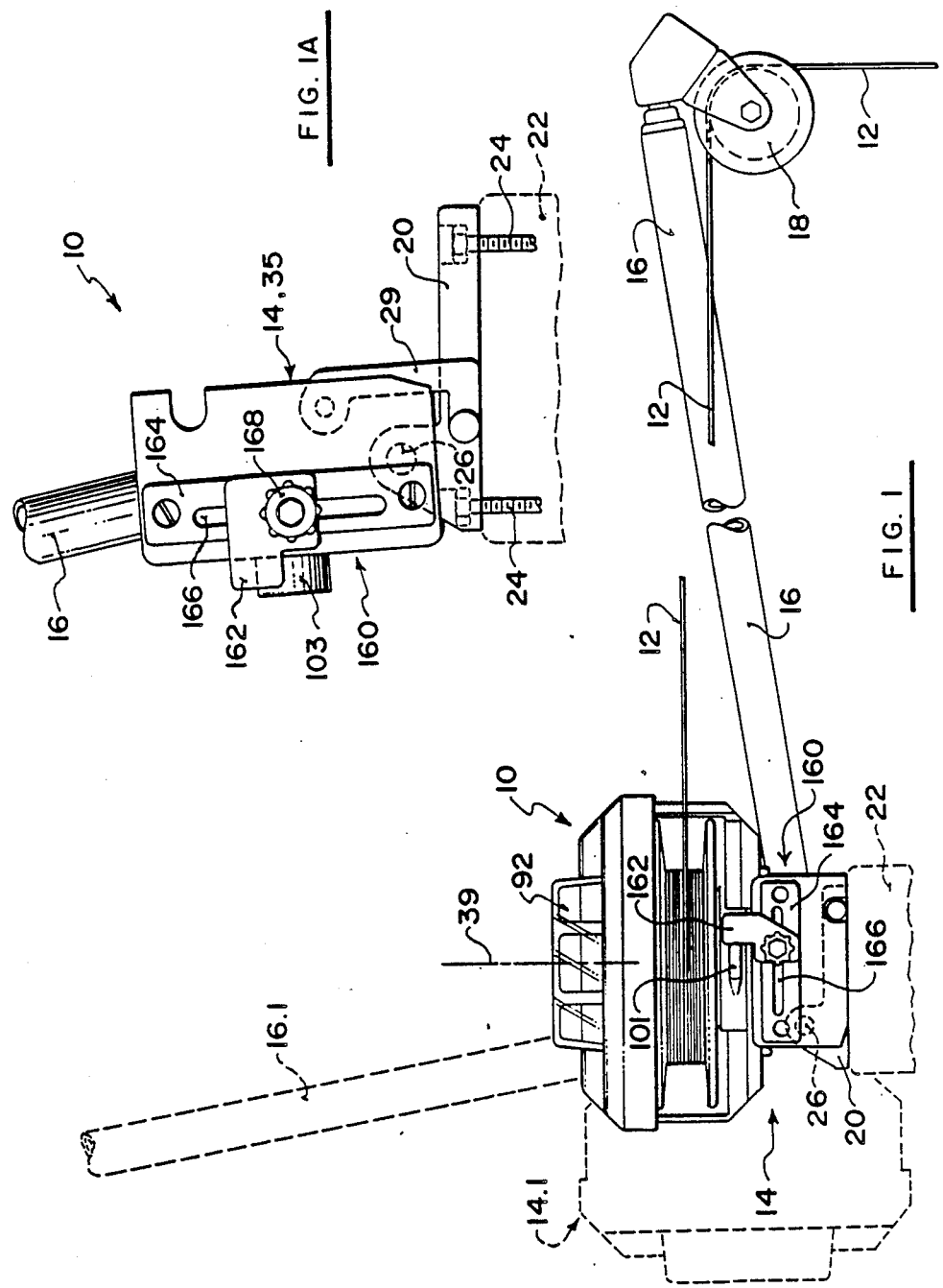

DOWNRIGGER APPARATUS FOR TROLLING

BACKGROUND OF THE INVENTION

The invention relates to a downrigger apparatus for spooling a weight line carrying a weight, which releasably positions a fishing lure on a separate fishing line at a desired depth in water for trolling.

Prior art downrigger apparatus are known and are commonly carried on the gunwale of a vessel to suspend a heavy weight at the end of a weight line extending from the downrigger. The line is wound on or off a spool of the downrigger, either manually or using electrical power. There are usually hundreds of feet of line wound on the downrigger spool, and as the weight can be between 10 and 15 pounds, considerable time and effort can be expended in manually winding the weight upwards to position the fishing lure at shallower depths, or to wind in the weight when fishing in a particular location is finished, or to inspect or change the fishing lure. If one operator is in control of several downriggers, it can be difficult to raise the weights of all downriggers quickly, for example after a fish has taken the hook, or the boat is unexpectedly approaching shallower water. In either case it is usual to raise all the downriggers as quickly as possible, either to prevent entangling the fishing line on the weight lines, or to prevent the weight from contacting the bottom of the body of water as described below.

When fishing close to an uneven sea bed or lake bottom, the weight can become fouled or "hung up" in rocks, water-logged logs, or other debris on the bottom which initially prevents winding up the weight, or prevents further progress of the vessel. If the weight is to be wound up manually, excessive winding load is experienced by the operator, who would then normally reposition the vessel in such a way as to pull the weight free, thus enabling the weight to be wound upwards freely. It is usually easy for the manually winding operator to detect when the weight is hung up and immediate corrective action can usually be taken. Difficulties can arise when the weight of an electrically powered downrigger is hung up as the hang-up may not be immediately obvious.

Some prior art manually operated downriggers require two-handed operation, namely one hand for winding the spool, and the other hand for operating a manually actuated brake to brake the spool carrying the line. When the weight attains a desired depth, the brake is actuated to hold the weight at that depth. In the present Applicant's U.S. Pat. No. 4,044,968, means are shown to provide an automatic downrigger brake which is actuated automatically when the spool commences to unwind. This enables one-handed operation of the downrigger, as the brake is automatically applied as soon as the operator permits the spool to unwind a few degrees. Alternatively, the brake of the Applicant's patent can be applied directly using the other hand to lock the spool. This patented device has a brake member which is moved into engagement with the reel by a pair of spaced rollers which act as cams by engaging a pair of similar helical surfaces of the brake member. Rotation of the spool when unwinding line from the spool can automatically move the brake member into engagement with the spool, thus braking the spool against rotation. While the rollers and helical surfaces of this patented structure are adequate for manual operation, difficulties would likely be encountered if this type of automatic brake were used with an electrically powered downrigger.

Some electrically powered downriggers known to the inventor incorporate a worm and worm wheel gear reduction assembly to reduce r.p.m. of the spool with respect to the motor. In some of these devices, a direct brake on the spool is not provided to prevent unwinding of the spool. Instead, some apparatus use the so-called "self-locking ability" of the worm gear and worm wheel. Theoretically, a worm gear will not "back drive" or be "reverse driven" if the friction angle is greater than the worm lead angle, and this self-locking ability has been used in many applications incorporating worm gears and worm wheel assemblies. However, for use with downriggers, where fluctuating loads are experienced, self-locking ability of the worm wheel is not reliable, and inadvertent unwinding of the reel can take place with this type of indirect braking due to the fluctuating loads. Furthermore, use of the gears to prevent inadvertent unwinding, as opposed to a direct spool brake, subjects the gears to additional, non-driving load, aggravating wear and sometimes causing premature failure. No electrical downriggers known to the inventor have automatic direct braking of the spool when the motor stops, and thus a separate manual action is required to brake the spool when the motor stops. A further alternative would be to use the resistance to back-driving of the motor to prevent the reel from inadvertantly winding out the line.

Furthermore, some electrical downriggers that rely on the gear reduction between the motor and the spool to prevent the spool from unwinding have to be driven in reverse to lower the weight, i.e. the weight is "powered down". A reversing switch for the motor is required, and the speed of lowering the weight is usually very close to the speed of raising the weight, unless a variable motor speed control is supplied, or the gear ratio can be changed to permit faster lowering of the weight than raising of the weight. If the weight must be lowered by "powering down" using the motor, the motor is subjected to twice as much wear as would be the case where a weight can be lowered without powering down.

With electrical downriggers it is known to provide an overload device which prevents overloading of the electric motor during winding in, should the weight hang up on the bottom which would prevent the reel from rotating to wind up the line. Such overload devices include circuit breakers and/or thermal switches in the motor, which are responsive to excessive current and/or to heat generated in the electric motor. Some devices include friction clutches which slip when a threshold torque applied by the motor is exceeded. None of these overload devices are totally satisfactory as the operator is not usually aware that an overload situation has occurred, unless he is closely monitoring rotation of the reel. Consequently, when a motor overload situation arises with a prior art apparatus, the motor might be damaged if the overload device is not properly activated, or the friction clutch can slip for sometime before it is noticed and can become overheated, possibly causing permanent damage. To the inventor's knowledge, no downrigger overload devices are provided which generate an audible signal to warn the operating than an overload situation has occurred.

SUMMARY OF THE INVENTION

The invention reduces the difficulties and disadvantages of the prior art by providing a downrigger apparatus which is powered by an electrical motor and provides an automatic brake which is automatically actuated when the motor is stopped, thus not requiring manual intervention and preventing accidental unwinding of line from the spool. The spool is braked directly, thus reducing loading on the transmission extending between the motor and the spool. Furthermore, because the spool is not braked using the transmission, the weight can be easily lowered by the spool without requiring "powering down" of the weight as in some prior electrical downriggers. The brake cooperating directly with the spool can be finely adjusted to provide an optimum speed of descent for the weight, without requiring any further manual intervention until the desired depth of the weight is attained. Similarly the brake can be finely adjusted to provide a optimum slipping load during trolling, to protect the gear from "hang-up" problems. Furthermore, in one embodiment a clutch is provided in the transmission to transmit torque from the motor to the spool below a slipping threshold torque, but which slips and generates an audible warning signal when the threshold torque is exceeded, for example when winding in the line when the weight has hung up or been fouled on the bottom. In another embodiment, it may be desirable to eliminate the clutch which prevents torque transmission from the motor to the spool above the slipping threshold torque, and a substitute circuit breaker can be provided in the motor circuit so as to protect the motor should the weight become hung up.

The apparatus according to the invention is for spooling a line carrying a weight and includes a body portion, a spool, and a braking means. The body portion has a motor and a main journalling means having a main axis of rotation, the motor having an output drive means. The spool is journalled for rotation about the main axis and is adapted to spool the line which supports the weight. The spool has a spool input drive means operatively connected to the output drive means of the motor to rotate the spool in a forward direction to wind in the line. The braking means cooperates directly with the spool and automatically brakes the spool means when the spool rotates in a direction to unwind the line therefrom.

Preferably, the apparatus also has a clutch means which slips when a slipping threshold torque is exceeded, and generates an audible warning sound when so slipping. The slipping clutch means cooperates with the output drive means of the motor and the spool input drive means to transfer torque therebetween below the slipping threshold torque.

A detailed disclosure following, related to drawings, describes a preferred embodiment of the invention which is capable of expression in structure other than that particularly described and illustrated.

DESCRIPTION OF THE DRAWINGS

FIG. 1 is a simplified fragmented side elevation of a downrigger according to the invention, the downrigger being shown in full outline in a lowered operative position, and partially in broken outline in a raised, stowed position, FIG. 1A is a simplified fragmented side elevation of a base portion and adjacent structure of the downrigger of FIG. 1, shown in full outline in the raised, stowed position.

DETAILED DISCLOSURE

Figures 2, 2A:
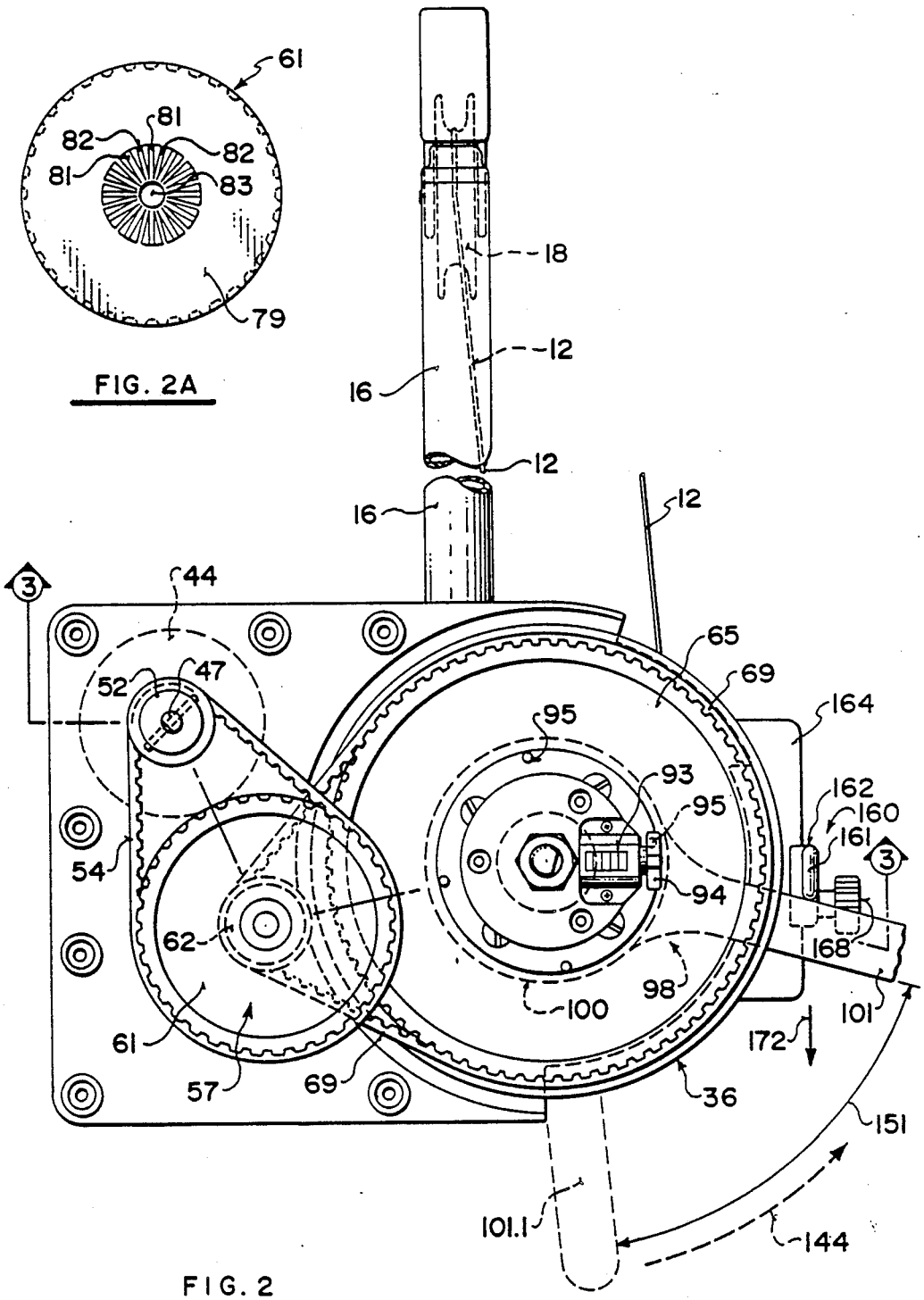
FIG. 2 is a simplified fragmented top plan view of the apparatus shown in a lowered, operative position, many portions being omitted for clarity.
FIG. 2A is a simplified bottom plan view of one portion of a clutch assembly of the invention.
Figure 3:
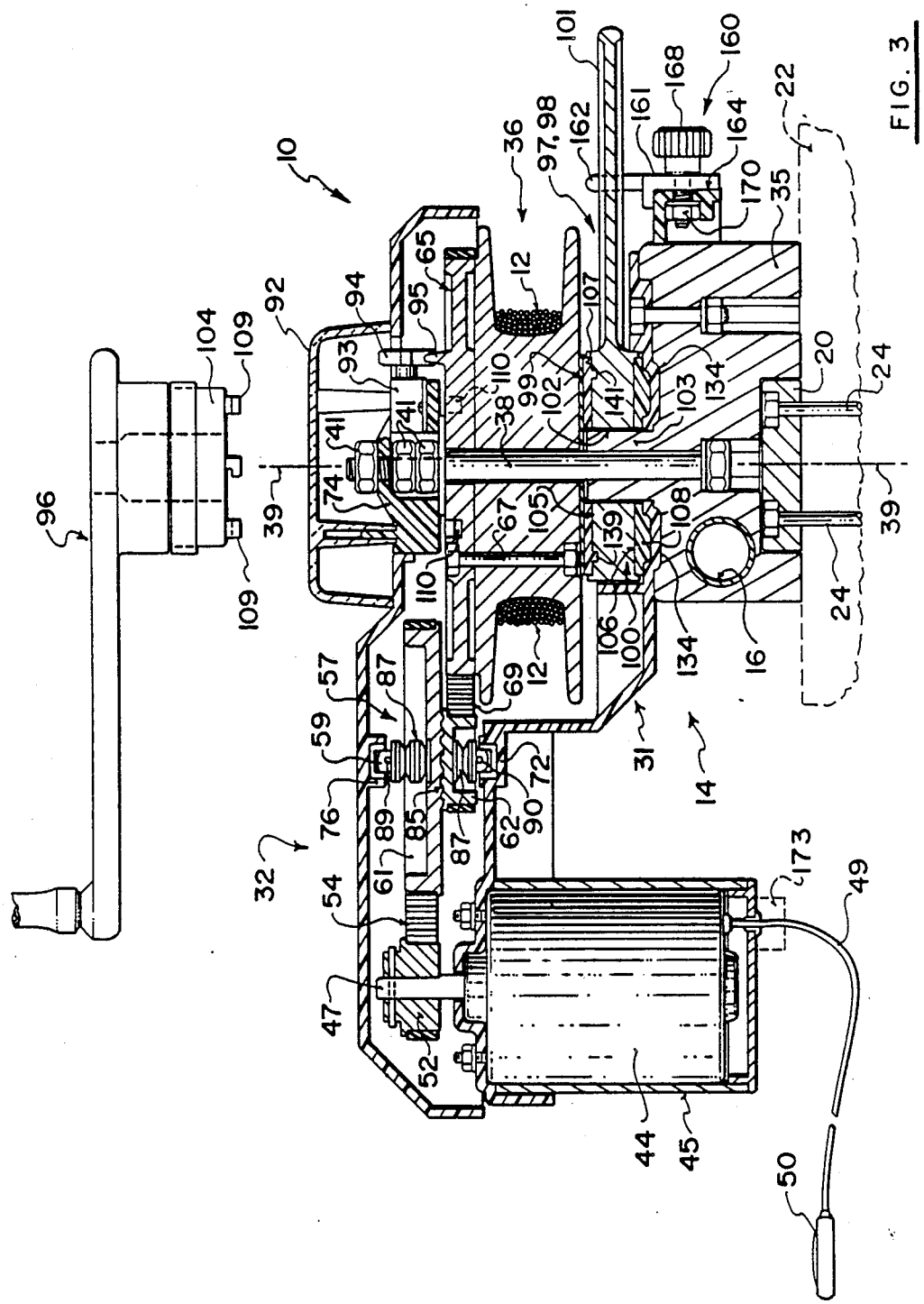
FIG. 3 is a simplified fragmented non-linear section on Line 3—3 of FIG. 2, planes of section of the drawing being taken through axes of spindles of the apparatus, an emergency manual handle being shown separated from the apparatus.

FIGS. 1 through 3

Referring to FIG. 1, a downrigger apparatus 10 according to the invention has a line 12 for carrying a weight which is used to position a fishing lure on a separate fishing line at a desired depth in water for trolling, none of which are not shown. The apparatus has a body portion 14, a rod portion 16 extending from the body portion, and a free-wheeling sheave 18 swivellably connected to an outer end of the rod 16 and carrying the line 12. The apparatus includes a base portion 20 which is adapted to be secured to a gunwale or other portion of a vessel 22 (broken outline), by suitable screw or bolt means 24, shown in FIG. 1A. A hinge portion 26 hingedly connects the base portion 20 to the body portion 14 to permit the body portion to swing about a horizontal axis relative to the base portion. In FIG. 1, the body and rod portions 14 and 16 are shown in full outline in a lowered operative position, and in broken outline at 14.1 and 16.1 in raised inoperative or stowed positions, in which the downrigger is stowed for travelling to and from the fishing site. The hinge portion includes a locking arm 29 which swings from lowered position in FIG. 1, to a raised position in FIG. 1A where it cooperates with the body portion 14 to hold the body portion in the raised position. The locking arm is hinged at an inner end thereof to the base portion and cooperates with the body portion to hold the body portion securely in the raised position.

Referring also to FIGS. 2 and 3, the body portion 14 of the apparatus includes a first or lower housing 31, and a second or upper housing 32. The housings are releasably connected together to provide access as required and to provide a housing assembly which contains and protects components within the assembly. The lower housing 31 includes an intermediate body portion 35 which cooperates with the hinge portion 26.

The apparatus includes a spool 36 carrying the line 12 and journalled on a main spindle 38 for rotation about a main axis of rotation 39. The spindle 38 is a bolt having a head mounted within the body portion 35 of the lower housing 31 and extending upwardly into the upper housing. The spool 36 is retained on the bolt by a pair of locked nuts 41, the bolt serving as a main journalling means which is concentric with the main axis of rotation 39. The body portion also houses an electric motor 44 mounted within a sealed, waterproof motor housing 45 connected to the lower housing, and having a sealed output drive shaft 47. Electricity is supplied to the motor through an electrical lead 49, and is controlled by a manual switch 50 which can be operated by an operator's hand, knee, foot or as desired. The output drive shaft 47 has a motor output pulley 52 secured thereto, the pulley having shallow teeth adapted to engage a complementary elastomeric toothed drive belt 54 as will be explained.

The apparatus includes a clutch assembly 57 having a clutch spindle 59 journalled in the upper and lower housings of the body portion and carrying complementary clutch input and output pulleys 61 and 62. The pulleys 61 and 62 have grooved peripheries to engage teeth of toothed drive belts 54 and 69 respectively. Thus the drive belt 54 serves as a clutch input belt and extends between the motor output pulley 52 and the clutch input pulley member 61 so as to transfer drive between the motor and the clutch assembly.

The spool has a spool input pulley 65 secured thereto by bolts 67, one only being shown in FIG. 3, the spool input pulley having a toothed periphery which engage teeth of the drive belt 69 extending from the output pulley 62. The belt 69 is generally similar to the belt 54 and serves as a clutch output belt extending between the clutch output pulley member and the spool input pulley to transfer a drive between the clutch assembly and the spool. As best seen in FIG. 2, the motor output pulley 52 is considerably smaller than the clutch input pulley 61, and the clutch output pulley 62 is considerably smaller than the spool input pulley 65. The difference in size between the driving and driven pulleys produces a considerable gear reduction between speed of rotation of the motor output shaft 47 and the speed of rotation of the spool 36, thus enabling a relatively small high-speed motor 44 to power the spool and provide sufficient torque to raise a weight of between ten and fifteen pounds on the end of the line 12.

It can be seen that the invention has a toothed belt power transmission extending from the motor to the spool which provides an output drive means of the motor operatively connected to the clutch input member, and a spool input drive means operatively connected to the clutch output member. Furthermore, it can be seen that the first or lower housing 31 carries a main spindle mounting for the main spindle 38, i.e. the head end of the bolt, and a first clutch spindle mounting 72 to journal a lower end of the clutch spindle 59. Also, the second or upper housing 32 carries a second main spindle mounting 74 to steady the upper end of the spindle 38. A remaining outer nut 41 retains the spindle 38 in the housing 32, and clearly the main spindle mountings are aligned to carry respective ends of the main spindle. Furthermore, the second housing also carries a second clutch spindle mounting 76 to journal an upper end of the clutch spindle 59, and is clearly aligned with the first clutch spindle mounting 72. In FIG. 3, it can be seen that the main spindle, the clutch spindle and the motor spindle are parallel to each other, and the belts 54 and 69 extend between respective pulleys in two spaced generally parallel planes.

The clutch assembly 57 will now be described in detail. As best seen in FIG. 2A, the clutch input pulley 61 has a lower or inner face 79 having a plurality of radially extending projections and recesses 81 and 82 respectively which extend outwardly from an opening 83 for the spindle 59 to a radius approximately equal to radius of the clutch output member 62. The projections and recesses are generally complementary to each other and cooperate with a similar plurality of projections and recesses on the inner or upper face 85 of the clutch output member 62, FIG. 3 only. The recesses serve as projection engaging means and have side walls which cooperate with side walls of the projections to produce a "camming" effect tending to force the pulleys 61 and 62 apart as a result of relative rotation between the two pulleys. While the projections and recesses can be exact mirror images of each other, about 0.050 inches deep and with sloping side walls of about 45°, and narrow flat crests and troughs, other shapes are possible which would function in a similar manner. The projections and recesses of the inner faces 79 and 85 are shown generally diagramatically in FIG. 3 in a cross-section, which is necessarily approximate.

The clutch assembly 57 includes a plurality of dished spring washers 87 (for example, as sold under the trademark "Belleville") stacked on the spindle 59 on opposite sides of the input and output pulleys 61 and 62 and compressed between a pair of cotter pins 89 and 90 adjacent upper and lower end portions of the clutch spindle 59. The cotter pins pass through respective undesignated openings in the spindle, and the number of washers interposed between the cotter pins and clutch members determines the inwardly directly engaging force between the clutch members. The clutch members are mounted for axial movement on the spindle, and thus are forced towards each other by the spring washers to bring the projections and recesses of one member into engagement with the recesses and projections respectively of the other member. The spring washers force the clutch members together to transmit torque therebetween by engaging the said recesses with the said projections. The number of washers is selected so as to transmit torque between the input and output means, which torque is below a specific torque, termed "slipping threshold torque". The threshold torque has been selected from experience to prevent overload of the motor when the motor is driving the spool. Normally, the slipping threshold torque is well above the torque required to normally wind up the weight and well below a stalling torque that can be imposed on the motor to prevent rotation thereof. The size and spacing of the projections and recesses, and the shape thereof are selected to permit slippage between the input pulley driven by the motor, and the output pulley connected to the spool when the slipping threshold torque is exceeded. When slipping occurs, the projections and recesses of the pulleys slide rapidly over each other and generate an audible warning signal which alerts the operator to the fact that the clutch is slipping and that power to the motor should be switched off. The projections and recesses of the pulleys are molded from a tough plastic, such as nylon, which has a required wear resistance and coefficient of friction which permits slipping above the threshold torque and resists slipping below the threshold torque.

It can be seen that the clutch means slips when the slipping threshold torque is exceeded and generates an audible warning signal when so slipping. The clutch means cooperates with the output drive means of the motor and the spool input drive means to transfer torque therebetween below the slipping threshold torque. The spring washers serve as resilient engaging means for forcing the clutch input and output members into driving engagement to transmit therebetween torque below the slipping threshold torque, and to prevent transmission therebetween of torque above the slipping threshold torque thus protecting the motor from overload.

The invention also includes an automatic braking means 97 which resembles, to some extent, portions of structure disclosed in the present applicant's U.S. Pat. No. 4,044,968. This patent discloses a manually operated downrigger with an automatic brake which automatically brakes the spool of the downrigger when torque from weight on the line exceeds winding force applied by the operator, which occurs usually when the handle operating the downrigger is released i.e. the brake is automatically applied when winding stops, without requiring a separate or direct actuation of the brake. The brake of the said patent has a pair of diametrically disposed rollers which serve as cams and are not found in the present invention. The rollers contact helical surfaces in a small contact area which is subject to high bearing pressure and is considered unsuitable for heavy-duty application expected with an electrical downrigger. Furthermore, the braking means 97 of the present invention has a more finely adjustable and consistent braking means which can be set to permit slipping of the brake for specific applications, to a far higher degree of accuracy than that found in the said patent. This enables the brake to be set to permit the spool to slip at a force greater than the normal drag force due to the weight alone on the line, but well below the force that would cause the weight to be released from the end of the line. Thus, the brake can be adjusted to tolerate drag of the weight on the line that can occur when passing through heavy seaweed, or other factors that would normally increase load on the braked spool that would cause it to slip if set to slip at a load due to the weight alone.

The braking means 97 of the present invention includes a brake member 98 which has a generally circular inner portion 100, and a radially extending manually actuated handle 101. The portion 35 of the lower or first housing 31 has a cylindrical boss 103 which encloses a lower portion of the spindle 38 and passes through a central opening 102 of the member 98 to serve as a bearing for the braking member 98 to permit rotation of the handle about the axis 39. As will be described with reference to FIG. 4 and 6, the inner portion 100 has upper and lower surfaces 105 and 106 respectively which cooperate with a braking element 107 and a brake actuating means 108 respectively. A braking disc 99, made from a thin sheet of polished brass, is secured to a lower surface of the spool 36 and cooperates with the braking element 107.

A line length counter 93 is mounted in the upper housing within a removable transparent cover 92, and has a star wheel 94 which is rotated by a tooth 95 carried on the spool input pulley 65. Each revolution of the pulley 65 rotates the star wheel 94 a predetermined amount, and the counter has a display to indicate length of line extending between the weight and the spool as is well known in the trade. An emergency handle 96 has an inner portion 104 having a plurality of engaging dogs 109 extending downwardly therefrom. The spool input pulley 65 has a plurality of dog recesses 110 on an upper surface thereof, which are complementary to and engage the dogs 109 to permit driving between the handle and the pulley. This provides a means of winding up the line by rotating the pulley manually, should the motor or portions of the transmission become inoperative.

Figure 4:
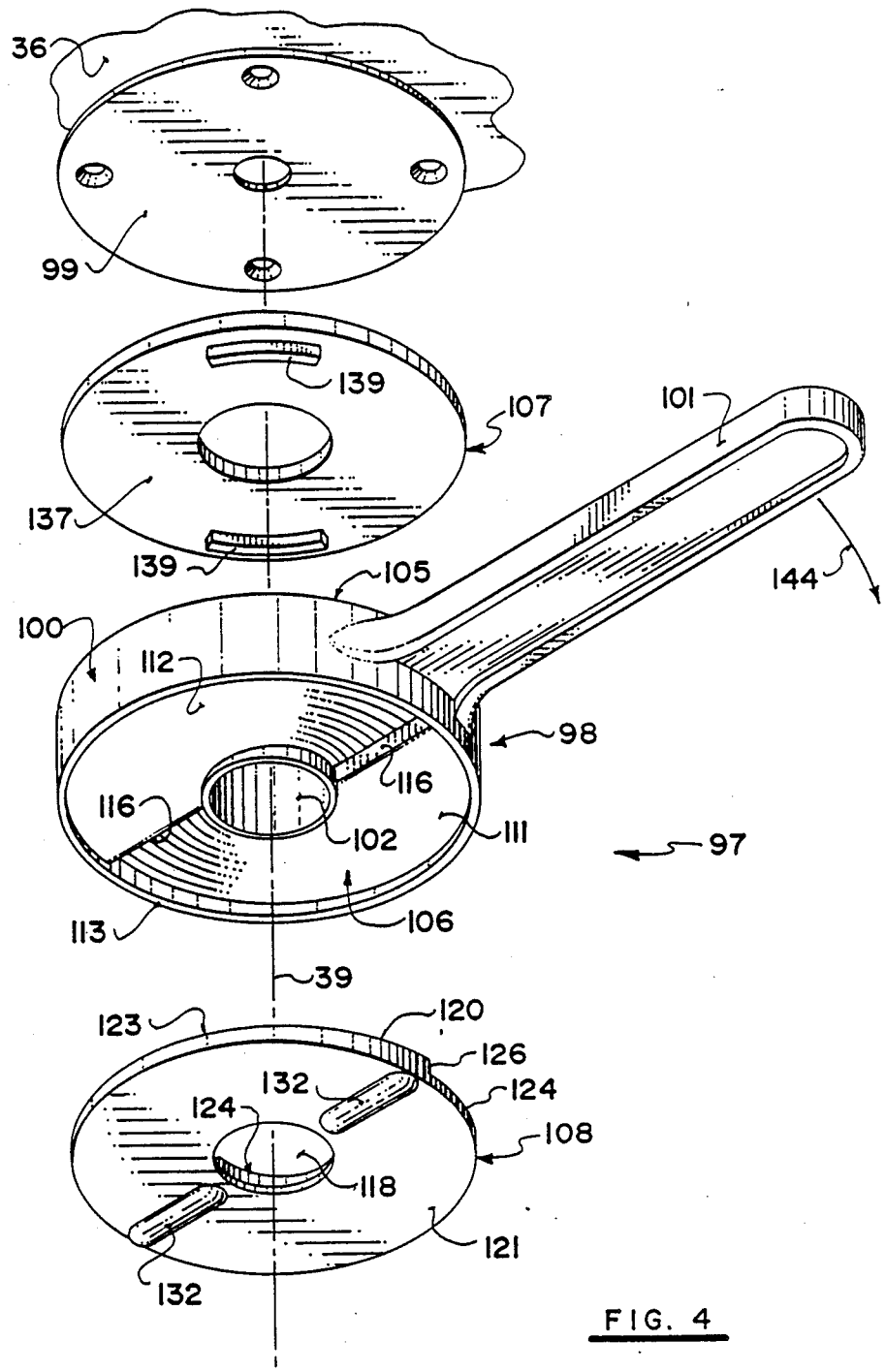
FIG. 4 is a simplified "exploded" perspective of main components of an automatic braking device of the invention.
Figure 5:
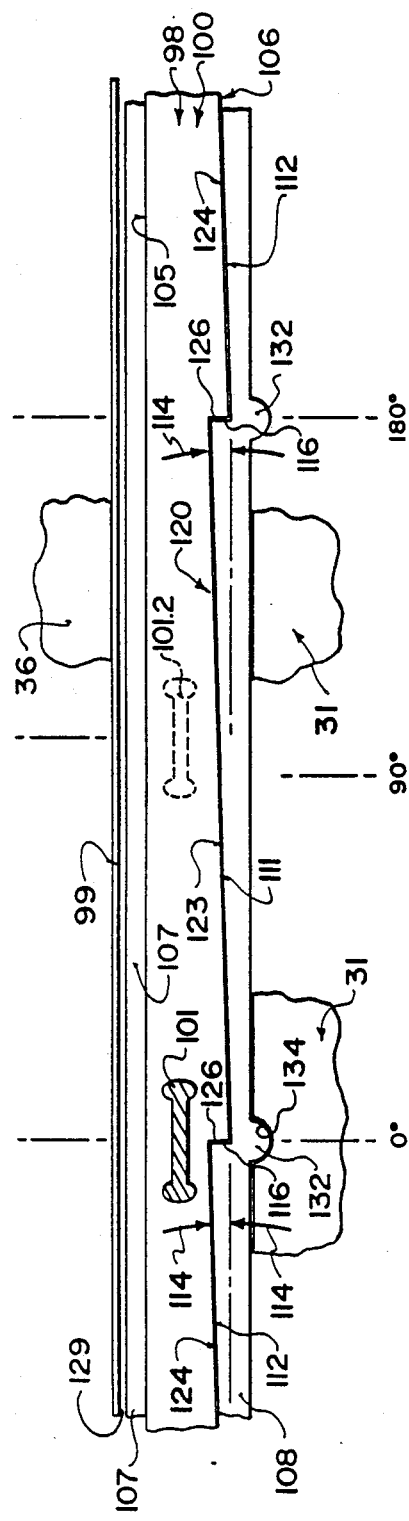
FIG. 5 is a simplified diagram of a portion of the braking apparatus, shown in an "unwrapped" side elevation, a brake actuating means being shown in a freely rotatable or weight lowering configuration.
Figure 6:
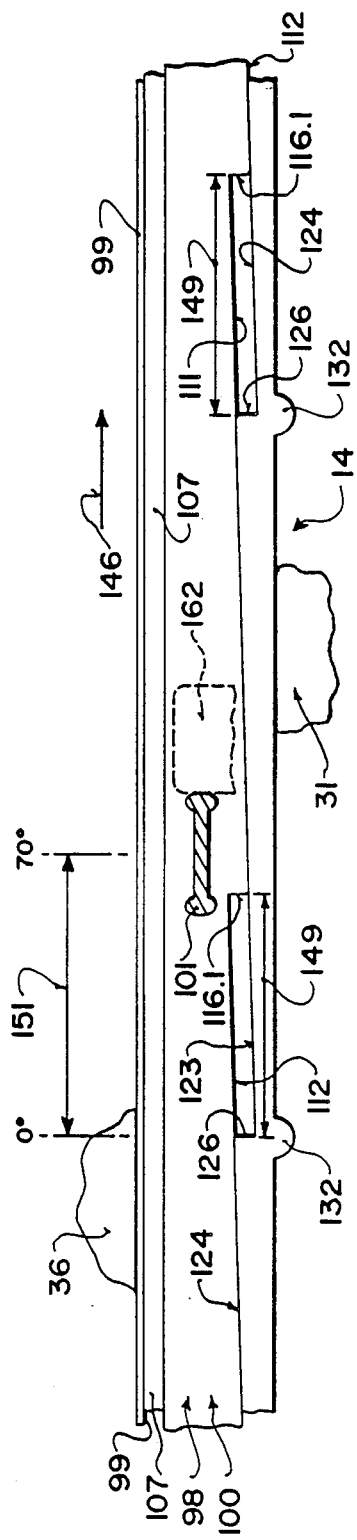
FIG. 6 is a simplified diagram, generally similar to FIG. 5, the brake actuating means being shown in an operating braked configuration in which the weight is stationary.

FIGS. 4 through 6

The braking means 97 is now described referring mainly to FIG. 4. The lower surface 106 of the brake member has a pair of similar first generally helical surfaces 111 and 112 which are concentric with the main axis 39. The surfaces 111 and 112 extend between the opening 102 and an outer cylindrical wall 113 and wind around the main axis at a particular helix angle, shown approximately in FIG. 5 and designated 114. The helical surfaces 111 and 112 are separated by a pair of parallel, opposed vertical steps 116 and resemble a twin start, slow pitch helical thread. The central opening 102 receives the circular boss 103 (FIG. 3) to permit rotation thereon, and to guide the brake member for axial movement along the axis 39 as will be described.

The brake actuating means 108 is a relatively thin disc having a central opening 118 to receive the boss 103, and thus is concentric with the axis 39, and also has upper and lower surfaces 120 and 121 respectively. The upper surface 120 is complementary to the lower surface 106 of the brake member and has a pair of second generally helical surfaces 123 and 124 separated by a similar pair of parallel opposed steps 126, one only being shown in FIG. 4.

The lower surface 121 of the brake actuating means 108 has a pair of diametrically opposed and aligned downwardly facing projections 132 which are adapted to engage complementary diametrically opposite and aligned recesses 134 in the base portion 135, as seen only in FIG. 3. The recesses 134 receive the projections 132 and prevent rotation between the brake actuating member 108 and the intermediate portion 35 of the lower housing.

The braking element 107 has a lower surface 137 having a pair of diametrically opposed, circumferentially extending ridges 139 which engage complementary diametrically opposed grooves 141 on the opposite surfaces of the brake member 105, which are shown only in FIG. 3. Cooperation between the ridges 139 and grooves 141 prevent rotation between the braking element 107 and the braking member 98. The braking element 107 is made from a material selected to have a high coefficient of friction when in contact with the lower surface of the brass braking disc 99. Because of its application in a water environment, the braking characteristics between the element 107 and the surface 99 should be predictable between wet and dry surfaces, and hot and cold surfaces. A polyurethane compound has been found suitable for use against brass, but other materials could be substituted. The means 108 and the element 107 can be easily replaced when excessively worn.

Referring to FIG. 5, the lower and upper surfaces 106 and 120 are shown in a "minimum throw" condition in which the steps 116 are closely adjacent to steps 126 so that the pair of first helical surfaces 111 and 112 of the brake member are in symmetrical complementary engagement with the pair of second helical surfaces 123 and 124 of the brake actuating means. In this "minimum throw" position, a gap 129 exists between the brake disc 99 secured to the lower surface of the spool 36, shown schematically in FIG. 5, and the braking element 107 cooperating with the brake member 98. This represents a broken outline position 101.1 of the brake handle as seen in FIG. 2.

This relative position between the brake member 98 and the brake actuating means 108 represents a "brakes off" condition, in which the spool 36 is free to rotate essentially without any braking force, apart from that generated in "back driving" the motor through the drive belts 69 and 54 and the clutch assembly 57. To increase braking force or drag on the spool from a relatively light drag to a complete stop, the handle 101 is rotated in direction of an arrow 144, as shown in FIGS. 2 and 4, which direction also represents unwinding of the line from the spool.

Referring to FIG. 6, rotating the handle 101 about the axis 39 (per arrow 144, FIG. 4) is depicted as an effective linear motion of the lower surface 106 with respect to the brake actuating means 108 in direction of an arrow 146. This movement causes the steps 126 between the second helical surfaces 123 and 124 to separate circumferentially by a circumferential distance 149, representing an "angle" of swing 151 of the handle through approximately 70 degrees between FIG. 5 and FIG. 6. The angle 151 and the resulting position of the handle 101 is shown in full outline in FIG. 2. This rotation of the braking member produces a relatively small upwards movement of the braking member along the helical surfaces, forcing the braking element 107 axially upwardly into contact with the braking disc 99 secured to the lower surface of the spool 36, thus braking the spool.

The lower surface of the brake disc 99 is defined as a first braking surface cooperating with the spool, and the upper surface of the braking element 107 is defined as a second braking surface of the brake member which is adapted to cooperate with the first braking surface. The brake actuating means 108 causes movement of the first and second braking surfaces into engagement with each other upon rotation of the spool in a direction so as to unwind the line, and actuating the brake. The rotation of the braking member can be direct manual movement of the handle 101, or by frictional drag on the brake member from the spool touching the element 107. Brake actuation is attained by the brake actuating means moving the braking member along the main axis 39 to force the second braking surface into engagement with the first braking surface. It can be seen that the brake actuating means 108 serves as a surface engaging means of the body portion for engaging the first helical surfaces of the brake member, so that rotation of the brake member in the direction to unwind the line moves the brake member along the axis to engage the first braking surface. While the surfaces 111 and 112 are shown as helical surfaces, clearly other inclined surfaces serving as cam surfaces could be substituted.

Clearly, the greater the angle of swing 151 of the handle 101 relative to a the "brakes off" position (designated 101.1 in FIG. 2) as shown in FIG. 5, the greater the degree of braking. A precise control of braking force can be obtained by swinging the handle through a few degrees, which enables an operator to gradually slow the rate of descent of the weight, thus reducing shock loads on the apparatus when the speed of descent of the weight is finally braked completely. For some applications, it is preferred that the handle 101 be located in a fixed position with respect to the apparatus to enable the operator to use both hands to perform other duties. This is attained by a simple brake force regulating means as will be described below.

FIGS. 1, 1A, 2, 3 and 6

A braking force regulating means 160 includes a manually adjustable stop member 161 which has a finger 162 which cooperates with the handle 101 as will be described. The braking force regulating means 160 includes a rack member 164 mounted on the intermediate body portion 35 and having an elongated slot 166 extending in a plane normal to the axis 39. A thumb screw 168 passes through an opening in the stop member and the slot 166 and is secured therein by a nut and washer 170. Clearly, loosening the thumb screw 168 permits the stop member 161 to be moved axially along the slot 166, and tightening the screw 168 locks the stop member in a particular position with respect to the slot.

As best seen in FIG. 2, rotation of the reel in direction of the arrow 144, due to unwinding of the line 12, is limited by interference between the handle 101 and the finger 162 of the regulating means 160. If the finger 162 is "backed-off", i.e. moved in direction of an arrow 172, the braking force is reduced because the circumferential distance 149 (FIG. 6) is reduced, thus reducing "the throw" and lowering the brake member slightly and reducing force between the first and second braking surfaces. Conversely, if the finger 162 is moved in a direction opposite to the arrow 172, the handle 101 can rotate through an angle greater than 151, thus increasing the distance 149 and increasing braking force between the surfaces. This provides a very simple and effective means of controlling a braking of the reel for several purposes as will be described.

It can be seen that the braking force regulating means 160 cooperates with the brake member to limit rotation of the brake member so as to control a degree of braking between the first and second braking surfaces, thus controlling the speed at which the reel unwinds under a given force from weight, or controlling force on line which is sufficient to unwind the line.

OPERATION

Much of the operation of the downrigger follows the normal operation of prior art downriggers with the exception of the automatic braking means and the automatic slipping clutch assembly.

In contrast to some prior art downriggers, the weight can be lowered without the motor which is normally used to wind up the weight. In this way, a controlled speed of descent can be attained which is irrespective of the power supplied to the motor. Normally, when the weight is hanging from the rod portions 16, the brake regulating means 162 would be disengaged from the handle 101 which would be in an extreme locked position 101.2 in FIG. 5. When the weight is to be lowered, the brake handle 101 is moved from an extreme locked position in a direction opposite to the arrow 144, so as to reduce braking force and permitting the weight to be lowered. Speed of descent of the weight is controlled critically by the handle 101, which, initially, is held manually and shifted slightly to determine the angle 151 to attain the desired speed of descent. If desired, the stop member 161 can be positioned on the rack member 164 to hold the handle 101 at the desired position to maintain the desired speed of descent of the weight, until the line length counter indicates that the desired depth is being approached. At this point, the brake regulating means 160 is released and the brake handle is adjusted manually until the desired depth is attained by gradually increasing braking force. The brake handle is finally located in a braked position, which can be set by the regulating means so that the applied braking force is less than the separation force which would cause the weight to separate from the end of the line. Thus, it can be seen that the belts 54 and 69 and associated pulleys and clutch mechanism provide a reversible transmission means for operatively connecting the spool input drive means to the output drive means of the motor, so that the motor can rotate the spool in a forward direction to wind in the line, and the reel can rotate in a reverse direction due to the weight unwinding the line therefrom, while concurrently rotating the motor in a reverse direction.

Trolling can commence at this desired depth and usually the brake handle 101 would not be touched until the weight was to be raised or lowered to other depths. However, if extra resistance is experienced by the weight, for example when dragging through heavy seawood, the braking force may be insufficient to prevent the line from unwinding slowly from the spool. If needed, the braking force can be increased by adjusting the brake regulating means 160 to prevent this unwinding, although care must be taken to ensure that the braking force does not exceed the separation force between the weight and the line otherwise the weight might be lost.

If the weight is to be raised there is no need to manually disengage the brake. Because the brake is engaged due to rotation of the spool to unwind the line, clearly, rotation in the forward direction would tend to disengage the brake. Consequently, as soon as torque is applied to the spool from the motor, the brake automatically disengages and permits the spool to rotate forwardly so as to wind in the line. Should the motor stop for any reason, the torque applied to the reel by the motor is reduced to zero, and as soon as the spool direction reverses to unwind line, the brake is immediately and automatically actuated. This automatic braking is superior to other types of downriggers known to the applicant which require a separate manual application of the brake. Furthermore, it can be seen that the brake is applied directly to the spool as opposed to the motor and thus load on the transmission between the motor and the spool is negligible while the spool of the present invention is braked.

Should the weight become "hung up" on the bottom, that is fouled on logs, rocks, etc., the spool is prevented from winding in, and resistance to rotation of the motor is increased until the slipping threshold torque is reached. When this occurs, the spring washers 87 deflect and permit the projections to "ride" out of the recesses so that there is slippage between the input pulley 61, driven by the motor, and the output pulley 62 which is effectively stopped by the drive belt 69 extending around the spool. Rotation of the input pulley 61 relative to the fixed output pulley 62 causes rapid sweeping of the projections and recesses of the inner faces of the input and output pulley, which generates an audible sound which resembles a machine gun. This sound immediately brings the slipping clutch to the operator's attention, and he would then normally stop the motor 44 and re-position the boat in such a way as to release the weight.

In an emergency situation, if the motor 44 seizes or the battery becomes flat, the emergency handle 96 (FIG. 3) is connected onto the spool 36 by removing the transparent cover 92 and upper housing 32 so that the engaging dogs 109 of the emergency handle can engage the complementary recesses 110 on the upper face of the pulley 65. This permits manually winding up of the weight which is necessary in an emergency situation. If the motor is seized, or if the resistance to turning of the motor is excessive, it would be necessary to disconnect one of the belts in the transmission, for example the drive belt 54 extending between the motor and the input pulley 61. This would permit free rotation of the spool to wind up the weight, without drag from the motor.

ALTERNATIVES

The apparatus as disclosed has the clutch assembly 57 located in the transmission to protect the motor from overload and to warn the operator with an audible warning signal. The example discloses the clutch assembly incorporated into the combination of the pulleys 61 and 62, but for some applications this may result in a warning signal of unacceptable frequency or intensity. The clutch assembly could be incorporated elsewhere in the transmission, for example in the combination of the spool input pulley 65 and the spool 36.

In some applications, it can be a difficult to design an audible alarm which is not excessive in frequency or intensity. If desired, the slipping clutch assembly can be eliminated by eliminating the spring washers 87, and non-resiliently clamping the input and output pulleys 61 and 62 together so as to completely prevent relative axial movement therebetween. A circuit breaker, shown in broken outline at 173 in FIG. 3, can be fitted in series with the motor so as to detect excessive motor current due to overload, which then would cut electricity to the motor preventing serious damage thereto. The circuit breaker could have an automatic reset or a manual reset which would permit operation of the motor when the factor causing the overload of the motor had been detected and removed.

The lower surface 106 of the braking member 98, and the upper surface of the brake actuating means 108 are disclosed as having respective pairs of helical surfaces which wind around the axis at similar helix angles. Two or more helical surfaces on each surface provide a relatively stable platform with negligible rocking for raising the brake member into contact with the spool. The helix angle is selected so that approximately 70° of handle rotation is necessary to actuate to brake from a "full-off" position, to the operating braked position, as seen in FIG. 2. By selection of a different helix angle, and clearance between the brake member and the spool, a single helical surface could be used on the lower surface 106 of the brake member, and on the upper surface of the brake activating means 108.

I claim:

1. An apparatus for spooling a line carrying a weight, the apparatus including:
   (a) a body portion having a motor and a main journalling means having a main axis of rotation, the motor having an output drive means,
   (b) a spool journalled for rotation about the main axis, the spool being adapted to spool the line which supports the weight, the spool having a spool input drive means and a first braking surface,
   (c) reversible transmission means for operatively connecting the spool input drive means to the output drive means of the motor so that the motor can rotate the spool in the forward direction to wind in the line, and, when not powered by the motor, the spool can rotate in a reverse direction due to force unwinding the line while concurrently rotating the motor in a reverse direction, (d) automatic braking means responsive to reverse rotation of the spool for automatically braking the spool, if needed, when the spool starts to rotate in the reverse direction to unwind the line therefrom, the braking means having a braking member journalled for rotation about, and for movement along, the main axis; the braking member also having a second braking surface which contacts the first braking surface of the spool directly so as to reduce braking loads on the transmission, the braking means including brake actuating means for moving the brake member along the main axis towards the spool when subject to frictional drag between the first and second braking surfaces when the spool rotates in the reverse direction and initiates engagement of the brake.

2. An apparatus as claimed in claim 1 in which the brake actuating means is characterized by:
(a) the brake member having a first inclined surface,
(b) the body portion has a surface engaging means for engaging the first inclined surface of the brake member, so that rotation of the brake member moves the brake member along the axis to engage the first braking surface.

3. An apparatus as claimed in claim 1 in which the brake actuating means is characterized by:
(a) the brake member having a first helical surface concentric with the main axis so as to wind around the main axis at a particular helix angle,
(b) the body portion having a second helical surface complementary to and in engagement with the first helical surface so that rotation of the brake member in the direction of rotation of the spool to unwind the line moves the brake member along the axis to engage the first braking surface.

4. An apparatus as claimed in claim 1 in which the braking means includes:
(a) a braking force regulating means cooperating with the brake member to control a degree of braking between the first and second braking surfaces.

5. An apparatus as claimed in claim 1 in which the braking means includes:
(a) a braking force regulating means cooperating with the brake member to limit rotation of the brake member so as to control a degree of braking between the first and second braking surfaces.

6. An apparatus as claimed in claim 1, the transmission means comprising: p1 (a) clutch means for slipping when a slipping threshold torque is exceeded, and to generate an audible warning sound when so slipping, the clutch means cooperating with the output drive means of the motor and the spool input drive means to transfer torque therebetween below the slipping threshold torque.

7. An apparatus as claimed in claim 6 in which the clutch means includes:
(a) complementary clutch input and output members,
(b) engaging means for engaging the clutch input and output members in driving engagement to transmit therebetween torque below the slipping threshold torque, and to prevent transmission therebetween of torque above the slipping threshold torque.

8. An apparatus as claimed in claim 7 in which the clutch means is further characterized by:

(a) the engaging means having projections on at least one clutch member, and having projection engaging means on the remaining clutch member,
(b) resilient means for forcing the projections and projection engaging means together, so as to transmit torque therebetween below the slipping threshold torque and to generate the audible signal when slipping.

9. An apparatus as claimed in claim 7 in which:
(a) the clutch input member has an inner face having a plurality of projections and recesses,
(b) the clutch output member has an inner face having a plurality of projections and recesses, which are complementary to the projections and recesses of the input member,
(c) at least one clutch member is mounted for movement towards the other clutch member to bring the projections and recesses of one member into engagement with the recesses and projections of the other member respectively, and the clutch means further includes:
(d) resilient means for forcing the clutch members together to transmit torque therebetween by engaging the said recesses with the said projections.

10. An apparatus as claimed in claim 9 in which:
(a) the clutch members are mounted for rotation about a clutch axis,
(b) the resilient means is a spring washer concentric with the clutch axis and adapted to force the clutch members together.

11. An apparatus as claimed in claim 7 in which the transmission means comprises:
(a) the output drive means of the motor having a motor output pulley,
(b) the clutch input means and the clutch output means having a clutch input pulley member and a clutch output pulley member respectively, the pulley members being mounted for rotation about a clutch axis,
(c) the spool drive means having a spool input pulley,
(d) a clutch input belt extending between the motor output pulley and the clutch input pulley member,
(e) a clutch output belt extending between the clutch output pulley member and the spool input pulley.

12. An apparatus as claimed in claim 1 in which:
(a) the main journalling means is a main spindle mounted on the body portion,
(b) the spool and braking member are journalled for rotation on the main spindle, and the apparatus further includes a clutch means comprising:
(c) a clutch spindle mounted in the body portion,
(d) complementary clutch input and output members mounted on the clutch spindle for rotation,
(e) the output drive means of the motor being operatively connected to the clutch input member, and the spool input drive means being operatively connected to the clutch output member,
(f) engaging means for engaging the clutch input and output members in driving engagement to transmit therebetween torque below a slipping threshold torque, and to prevent transmission therebetween of torque above the slipping threshold torque.

13. An apparatus as claimed in claim 12 in which:
(a) the body portion has first and second housings, the first housing carrying a first main spindle mounting, and a first clutch spindle mounting, and the second housing carrying a second main spindle mounting and a second clutch spindle mounting, the main spindle mountings being aligned to carry respective ends of the main spindle, and the clutch spindle mountings being aligned to carry respective ends of the clutch spindle, (b) the motor has a motor spindle carrying the output drive means thereon, (c) the main spindle, the clutch spindle and the motor spindle being parallel to each other.

14. An apparatus as claimed in claim 1 further including:

(a) a base portion and a hinge portion, the hinge portion hingedly connecting the base portion to the body portion, the base portion being adapted to be secured to a portion of a vessel, so that the hinge permits the body portion to swing about the base portion to swing the apparatus relative to the vessel between operative and inoperative positions.

15. An apparatus as claimed in claim 1 in which the brake actuating means is characterized by:

(a) the brake having a pair of similar first helical surfaces concentric with the main axis so as to wind around the main axis at particular helix angle, (b) the body portion having a pair of second helical surfaces complementary to, and in engagement with, the pair of first helical surfaces, so that rotation the brake member moves the member along the axis to engage the first braking surface.

16. An apparatus for spooling a line carrying a weight, the apparatus including:

(a) a body portion having a motor and a main journalling means having a main axis of rotation, the motor having an output drive means, (b) a spool journalled for rotation about the main axis, the spool being adapted to spool the line which supports the weight, the spool having a spool input drive means operatively connected to the output drive means of the motor to rotate the spool in a forward direction to wind in the line, (c) braking means for automatically braking the spool when force on the line rotates the spool in a reverse direction to unwind the line therefrom, the braking means cooperating directly with the spool and including, (i) a first braking surface rotatable with the spool, (ii) a brake member having on one side thereof a second surface adapted to contact the first braking surface, the brake member also having on an opposite side thereof a first helical surface concentric with the main axis so as to wind around the main axis at a particular helix angle, (iii) brake actuating means for moving the first and second braking surfaces into engagement with each other, the brake actuating means cooperating with the brake member so that rotation of the spool to unwind the line therefrom actuates the brake automatically, if desired, initially by frictional drag between the brake member and the spool, the brake actuating means being further characterized by the body portion having a second helical surface complementary to and in engagement with the first helical surface, so that rotation of the spool in the reverse direction of rotation of the spool due to unwinding the line therefrom frictionally rotates the brake member, and cooperation between the first and second helical members moves the brake member along the axis to engage the first braking surface to brake the spool against rotation.

17. An apparatus as claimed in claim 16 in which:

(a) the first braking surface is adjacent a first surface of the spool, (b) the brake member is journalled for rotation about the main axis of rotation and is mounted to permit movement along the axis of rotation, (c) the brake actuating means moves the braking member along the main axis to force the second braking surface into engagement with the first braking surface.

18. An apparatus as claimed in claim 16 in which the braking means include:

(a) a braking force regulating means cooperating with the brake member to control a degree of braking between the first and second braking surfaces.

19. An apparatus as claimed in claim 16, further including:

(a) clutch means for slipping when a slipping threshold torque is exceeded and to generate an audible warning sound when so slipping, the clutch means cooperating with the output drive means of the motor and the spool input drive means to transfer torque therebetween below the slipping threshold torque.

20. An apparatus as claimed in claim 19 in which the clutch means includes:

(a) complementary clutch input and output members, (b) engaging means for engaging the clutch input and output members in driving engagement to transmit therebetween torque below the slipping threshold torque, and to prevent transmission therebetween of torque above the slipping threshold torque.

21. An apparatus as claimed in claim 20 in which the clutch means is further characterized by:

(a) the engaging means having projections on at least one clutch member, and having projection engaging means on the remaining clutch member, (b) resilient means for forcing the projections and projection engaging means together, so as to transmit torque therebetween below the slipping threshold torque and to generate the audible signal when slipping.

* * * * *